United States Patent
Westbrook et al.

[11] 4,072,890
[45] Feb. 7, 1978

[54] VOLTAGE REGULATOR

[75] Inventors: L. V. Westbrook, Hopkins; R. L. Payne, Crystal, both of Minn.

[73] Assignee: Honeywell Inc., Minneapolis, Minn.

[21] Appl. No.: 733,450

[22] Filed: Oct. 18, 1976

[51] Int. Cl.$^2$ ............................................... G05F 1/56
[52] U.S. Cl. .................................................. 323/22 R
[58] Field of Search ................... 307/296 R, 297, 304; 323/16, 19, 22 R

[56] References Cited

U.S. PATENT DOCUMENTS

| | | | |
|---|---|---|---|
| 3,757,200 | 9/1973 | Cohen | 323/22 R |
| 3,925,720 | 12/1975 | Minami et al. | 323/22 R |

Primary Examiner—A. D. Pellinen
Attorney, Agent, or Firm—Allegretti, Newitt, Witcoff & McAndrews

[57] ABSTRACT

A voltage regulator using CMOS (complementary metal-oxide semiconductor) signal processing. A sample of the regulator's output voltage is supplied to a voltage-controlled oscillator which produces an unsymmetrical output waveform which in turn drives a switching transistor. The switching transistor, when ON, supplies power from an unregulated source to a load circuit. Any deviation in the regulated output voltage from the desired level causes a compensating change in the ratio of ON to OFF times of the switching transistor.

4 Claims, 1 Drawing Figure

VOLTAGE REGULATOR

BRIEF SUMMARY OF THE INVENTION

This invention relates to regulated power supply systems and more particularly to integrated circuit voltage regulators.

The field-effect transistor is widely used as the active element in large-scale integrated circuit signal-processing systems. The conductivity of the semiconductor "channel" which joins the "source" and "drain" electrodes of the FET can be controlled by varying the potential applied to the device's "gate" electrode. By changing the potential applied to the gate, which is normally a metal insulated from the channel semiconductor by an extremely thin oxide layer, the population of charge carriers within the channel (electrons in a "n-channel" device and holes in a "p-channel" device) can be controlled. The MOSFET (metal-oxide semiconductor field-effect transistor) can be extremely small, consumes very little power, is mechanically rugged, and exhibits a high input impedance. When MOSFETs are connected in complementary pairs (n-channel and p-channel), switching times and power consumption are still further reduced. For these reasons, and because such circuits have a very high "fan-out" capability (one circuit can operate many others), they are particularly suited to digital signal processing systems.

CMOS (complementary metal-oxide semiconductor) circuits also possess significant advantages in analog signal processing circuits. Using CMOS analog/digital conversion circuits, large-scale integrated circuits can be built in which both complex analog and digital processing is accomplished on a single chip.

Analog signal-processing circuits, and to a lesser extent digital circuits, commonly require a regulated source of electrical power for best performance. It accordingly is an object of the present invention to supply regulated power to circuits in an integrated circuit system from a subsection of that system, the subsection being a simple, efficient circuit compatibly implemented using the same fabrication techniques required for the remainder of the system.

In a principal aspect, the present invention takes the form of an integrated circuit voltage regulator which converts an unregulated voltage applied to an input conductor into a regulated voltage delivered to an output conductor. The regulator comprises at least first, second and third insulated-gate field-effect transistors, such as metal-oxide semiconductor devices. The conductivity of the channel of the first transistor varies in response to changes in the potential appearing on the output conductor to vary the rate at which a timing capacitor is charged. The second and third devices are of complementary conductivity type and are switched ON and OFF in phase opposition as the capacitor is alternately charged and discharged. The conductivity of the first transistor controls the duration of one-half cycle of the output waveshape, while the duration of the second half cycle is substantially constant. A fourth insulated gate field-effect transistor may be switched ON and OFF by this waveshape to gate varying amounts of power from the input conductor through a filter to the output conductor.

BRIEF DESCRIPTION OF THE DRAWING

These and other objects, features and advantages of the invention may be better understood by considering the detailed description which follows. In the description, reference will frequently be made to the attached drawing, in which.

DESCRIPTION OF THE PREFERRED EMBODIMENT

Figure 1:
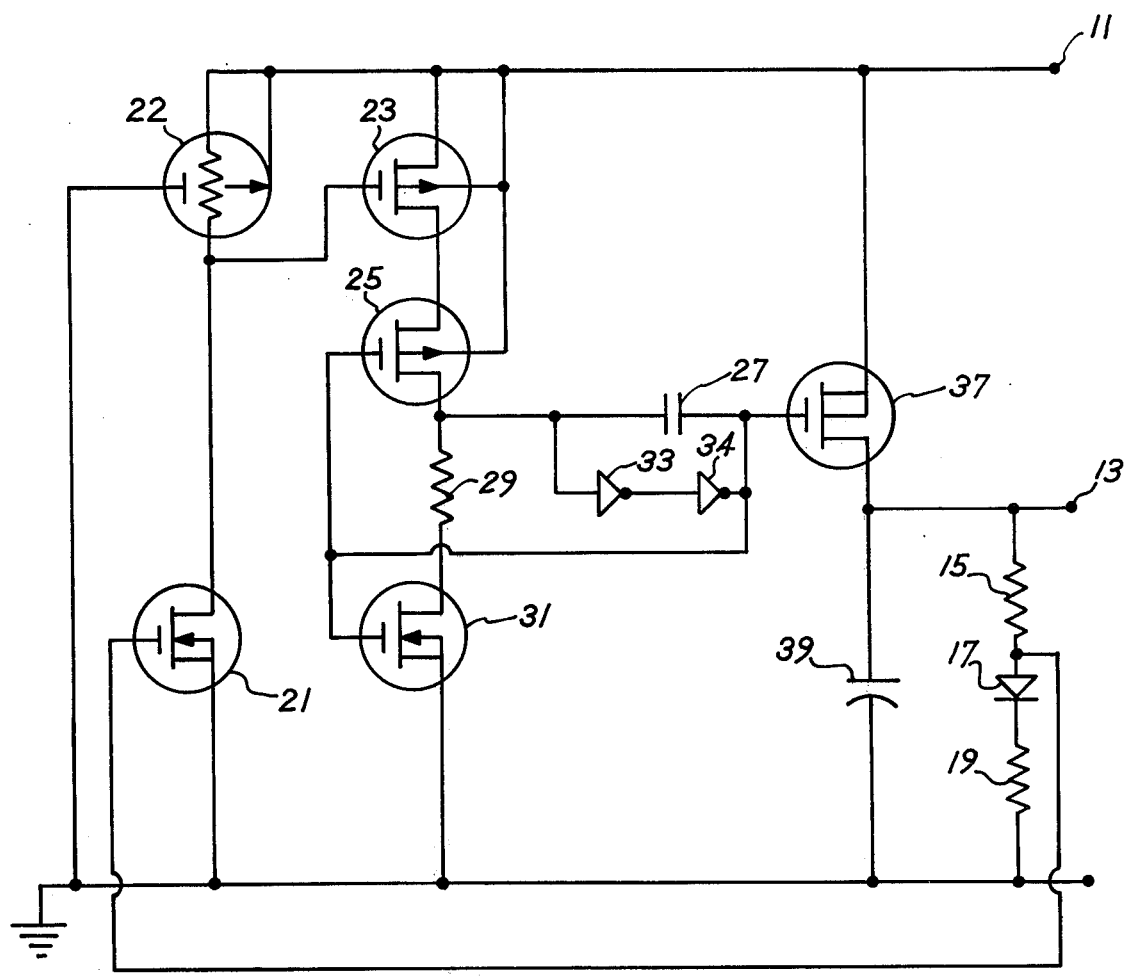
FIG. 1 is a schematic diagram of a voltage regulator circuit compatible with and itself implemented with CMOS components.

FIG. 1 of the drawings shows a voltage regulated power supply circuit which employs the principles of the present invention. An unregulated voltage is applied to terminal 11 and is converted into a regulated voltage at terminal 13. The series combination of a resistor 15, a diode 17, and a resistor 19 is connected between terminal 13 and ground. A connection to the junction between resistor 15 and diode 17 provides a sample of the regulated output voltage which is supplied to the gate electrode of a MOSFET (metal-oxide semiconductor field-effect transistor), indicated generally at 21. The substrate and source of transistor 21 are grounded and its drain is connected through the resistive channel of a MOSFET 22 to the unregulated supply voltage. The gate of MOSFET 22 is grounded and its substrate and source are connected to the unregulated supply. The drain of MOSFET 22 is connected to the gate of a MOSFET 23.

The output voltage sample applied to the gate of MOSFET 21 controls the magnitude of current flowing through the resistive MOSFET 22. Hence, the input voltage applied between the gate and source of MOSFET 23 is an amplified function of the regulated output voltage appearing between terminal 13 and ground. When the MOSFET 25 is turned ON (in the manner to be described), the channel current flowing through MOSFET 23 charges a timing capacitor 27 at a charging rate which is dependent upon the magnitude of the regulated output voltage.

The channel of MOSFET 25 is connected in series with a resistance 29 and the channel of a MOSFET 31 between the drain of MOSFET 23 and ground.

MOSFETS 25 and 31 operate in a switching mode, being turned ON and OFF in phase opposition. A pair of cascaded CMOS inverters 33 and 34 are connected in parallel with the timing capacitor 27. The output of the inverter 34 is connected to the gates of MOSFETS 25 and 31. If the output of the inverter 34 is assumed to be held at ground potential, the p-channel MOSFET 25 will be turned ON and the n-channel MOSFET 31 will be turned OFF. Under these conditions, the timing capacitor 27 will be linearly charged at a charging rate determined by the conductivity of MOSFET 23. Eventually, the linearly increasing voltage applied to the input of inverter 33 will reach its switching point, causing its output to switch toward ground potential, in turn switching the output of inverter 34 toward positive supply voltage. When the output of inverter 34 goes positive, MOSFET 25 is turned OFF and MOSFET 31 is turned ON. The timing capacitor 27 then discharges through the resistance 29 and the channel of MOSFET 31.

The output of inverter 34 is connected to the gate of a switching MOSFET 37 whose channel is connected between the unregulated supply terminal 11 and a filter capacitor 39. MOSFET 37 is a p-channel device which is conductive whenever the output of inverter 34 is switched to ground potential.

Voltage regulation within the circuit of FIG. 1 works as follows: Should, for example, the voltage at terminal 13 tend to decrease, the voltage applied to the gate of MOSFET 21 decreases its conductivity and decreases the current flowing through the MOSFET resistor 22. The reduced gate to source voltage supplied to p-channel MOSFET 23 decreases its channel conductivity and hence decreases the charging current supplied to the timing capacitor 27. As a result, the switching point of inverter 33 is reached at a later time, keeping MOSFET 37 in conductivity for a greater period of time, and hence increasing the average DC content of the waveform supplied to the filter capacitator 39.

It is to be understood that the specific arrangement which has been described is merely illustrative of one application of the principles of the invention. Numerous modifications may be made by those skilled in the art without departing from the true spirit and scope of the invention.

What is claimed is:

1. An integrated circuit voltage regulator for converting an unregulated potential applied to an input conductor into a regulated potential supplied to an output conductor comprising, in combination:
   at least first, second and third insulated-gate field-effect transistors each having a gate electrode and a transconductive channel,
   means for applying a potential having an amplitude related to said regulated potential to the gate of said first transistor,
   a timing capacitor,
   means for charging said timing capacitor through the series combination of the channels of said first and second transistors,
   means for discharging said timing capacitor through the series combination of a substantially constant resistance and the channel of said third transistor,
   and means for reversing the conductivity states of said second and third transistors when the voltage across said timing capacitor reaches a predetermined value.

2. A voltage regulator as set forth in claim 1 wherein said second and third transistors are of opposite conductivity type and wherein said means for reversing the conductivity states comprises, in combination
   two cascaded inverters connected across said timing capacitor and a connection between the output of the second of said inverters to the gates of said second and third transistors.

3. A voltage regulator as set forth in claim 1 wherein said means for applying a potential to the gate of said first transistor comprises fourth and fifth transistors of opposite conductivity type having their channels connected in series, said fourth transistor having the same conductivity type as said first transistor, a connection between the junction of the channels of said fourth and fifth devices and the gate of said first device, and a signal supply connection between said output conductor and the gate of said fifth transistor.

4. An integrated circuit voltage regulator for converting an unregulated voltage from a power source into a regulated voltage supplied to a load circuit comprising, in combination
   four insulated gate field-effect transistors each having a gate electrode and a transconductive channel,
   means connecting the channels of said first, second and third transistors in series across said power source, said second and third transistors being of opposite conductivity type,
   a timing capacitor connected between the junction of said second and third transistors and the gates of both said second and third transistors,
   a pair of cascaded inverters having their input connected to said junction point and their output connected to the gates of said second and third transistors,
   a switching transistor having its channel connected to supply power from said source to said load and its gate connected to the output of said cascaded inverters, and
   a feedback connection between said load circuit and the gate of said first transistor.

* * * * *